(12) United States Patent
Sinha et al.

(10) Patent No.: US 10,419,772 B2
(45) Date of Patent: Sep. 17, 2019

(54) PARALLEL ARITHMETIC CODING TECHNIQUES

(71) Applicant: QUALCOMM Incorporated, San Diego, CA (US)

(72) Inventors: Pavel Sinha, San Jose, CA (US); Mark Todorovich, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 539 days.

(21) Appl. No.: 14/925,761

(22) Filed: Oct. 28, 2015

(65) Prior Publication Data

US 2017/0127071 A1    May 4, 2017

(51) Int. Cl.
| | |
|---|---|
| *H04N 19/436* | (2014.01) |
| *H04N 19/13* | (2014.01) |
| *H04N 19/91* | (2014.01) |
| *H04N 19/139* | (2014.01) |
| *H04N 19/177* | (2014.01) |
| *H04N 19/43* | (2014.01) |
| *H04N 19/44* | (2014.01) |

(52) U.S. Cl.
CPC ........... *H04N 19/436* (2014.11); *H04N 19/13* (2014.11); *H04N 19/139* (2014.11); *H04N 19/177* (2014.11); *H04N 19/43* (2014.11); *H04N 19/44* (2014.11); *H04N 19/91* (2014.11)

(58) Field of Classification Search
CPC ...... H04N 19/43; H04N 19/436; H04N 19/44; H04N 19/13; H04N 19/177; H04N 19/139
USPC ........................................ 375/240.24–240.26
See application file for complete search history.

(56) References Cited

U.S. PATENT DOCUMENTS

| | | | |
|---|---|---|---|
| 5,045,852 A | * | 9/1991 | Mitchell ............. H03M 7/4006 341/51 |
| 7,079,050 B2 | | 7/2006 | Van Der Vleuten et al. |
| 2006/0220927 A1 | | 10/2006 | Park |

(Continued)

FOREIGN PATENT DOCUMENTS

| | | |
|---|---|---|
| GB | 2306868 A | 5/1997 |
| WO | 2012135442 A1 | 10/2012 |

OTHER PUBLICATIONS

International Search Report and Written Opinion—PCT/US2016/048244—ISA/EPO—dated Nov. 18, 2016.

(Continued)

*Primary Examiner* — On S Mung
(74) *Attorney, Agent, or Firm* — Polsinelli LLP

(57) ABSTRACT

Systems and methods for decoding compressed data are described herein. A memory may receive a data stream comprising a string of encoded symbols encoded using an arithmetic coding based coding technique. The string of encoded symbols represents a series of one or more decoded symbols. Each of the one or more decoded symbols comprises one of a most probable symbol and a least probable symbol. A processor may determine a number of consecutive most probable symbols in the series of one or more decoded symbols by performing a plurality of parallel mathematical comparisons based on one or more of the encoded symbols. The processor may further decode a group of symbols of the series of one or more decoded symbols based on the plurality of parallel mathematical comparisons. The group of symbols comprises the number of consecutive most probable symbols.

28 Claims, 5 Drawing Sheets

(56) References Cited

U.S. PATENT DOCUMENTS

| | | |
|---|---|---|
| 2009/0168868 A1 | 7/2009 | Jahanghir |
| 2012/0014457 A1 | 1/2012 | He et al. |
| 2012/0086587 A1* | 4/2012 | Sze .................... H03M 7/4018 341/107 |
| 2012/0293343 A1 | 11/2012 | Lee et al. |
| 2013/0044810 A1 | 2/2013 | Kao et al. |

OTHER PUBLICATIONS

Jiang J, "Parallel Design of Q-coders for Bilevel Image Compression," Parallel and Distributed Systems, 1994, International Conference on Hsinchu, Taiwan Dec. 19-21, 1994, Los Alamitos, CA, USA,IEEE Comput. Soc, Dec. 19, 1994 (Dec. 19, 1994), pp. 230-235, XP010223534, DOI: 10.1109/ICPADS.1994.590299 ISBN: 978-0-8186-6555-4.

Pennebaker W.B., et al., "An Overview of the Basic Principles of the Q-Coder Adaptive Binary Arithmetic Coder," IBM Journal of Research and Development, International Business Machines Corporation, New York, NY, US, Nov. 1, 1988 (Nov. 1, 1988), vol. 32(6), pp. 717-726, XP000111384, ISSN: 0018-8646.

\* cited by examiner

PARALLEL ARITHMETIC CODING TECHNIQUES

TECHNICAL FIELD

This disclosure relates generally to coding, including video coding. More specifically, this disclosure relates to systems and methods for decoding data, including video data, encoded using an arithmetic coding based coding technique by using parallel processing techniques.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which for some techniques may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

In addition to, or alternative to, digital video capabilities, devices may be capable of transmission and reception of any type of digital content, over the air or via wired links. Such digital content may be compressed before transmission.

SUMMARY

One aspect of the teachings of the disclosure relates to a method for decoding compressed data. The method comprises receiving a data stream comprising a string of encoded symbols encoded using an arithmetic coding based coding technique. The string of encoded symbols represents a series of one or more decoded symbols. Each of the one or more decoded symbols comprises one of a most probable symbol and a least probable symbol. The method further comprises determining a number of consecutive most probable symbols in the series of one or more decoded symbols by performing a plurality of parallel mathematical comparisons based on one or more of the encoded symbols. The method further comprises decoding a group of symbols of the series of one or more decoded symbols based on the plurality of parallel mathematical comparisons. The group of symbols comprises the number of consecutive most probable symbols.

Another aspect of the teachings of the disclosure relates to a system for decoding compressed data. The system comprises a memory configured to receive a data stream comprising a string of encoded symbols encoded using an arithmetic coding based coding technique. The string of encoded symbols represents a series of one or more decoded symbols. Each of the one or more decoded symbols comprises one of a most probable symbol and a least probable symbol. The system further comprises a processor configured to determine a number of consecutive most probable symbols in the series of one or more decoded symbols by performing a plurality of parallel mathematical comparisons based on one or more of the encoded symbols. The processor is further configured to decode a group of symbols of the series of one or more decoded symbols based on the plurality of parallel mathematical comparisons. The group of symbols comprises the number of consecutive most probable symbols.

Another aspect of the teachings of the disclosure relates to a non-transitory computer-readable medium having stored thereon instructions that, when executed, cause a processor of a device for decoding data to perform a method for decoding compressed data. The method comprises receiving a data stream comprising a string of encoded symbols encoded using an arithmetic coding based coding technique. The string of encoded symbols represents a series of one or more decoded symbols. Each of the one or more decoded symbols comprises one of a most probable symbol and a least probable symbol. The method further comprises determining a number of consecutive most probable symbols in the series of one or more decoded symbols by performing a plurality of parallel mathematical comparisons based on one or more of the encoded symbols. The method further comprises decoding a group of symbols of the series of one or more decoded symbols based on the plurality of parallel mathematical comparisons. The group of symbols comprises the number of consecutive most probable symbols.

Another aspect of the teachings of the disclosure relates to a system for decoding compressed data. The system comprises means for receiving a data stream comprising a string of encoded symbols encoded using an arithmetic coding based coding technique. The string of encoded symbols represents a series of one or more decoded symbols. Each of the one or more decoded symbols comprises one of a most probable symbol and a least probable symbol. The system further comprises means for determining a number of consecutive most probable symbols in the series of one or more decoded symbols by performing a plurality of parallel mathematical comparisons based on one or more of the encoded symbols. The system further comprises means for decoding a group of symbols of the series of one or more decoded symbols based on the plurality of parallel mathematical comparisons. The group of symbols comprises the number of consecutive most probable symbols.

DETAILED DESCRIPTION

Figure 1:
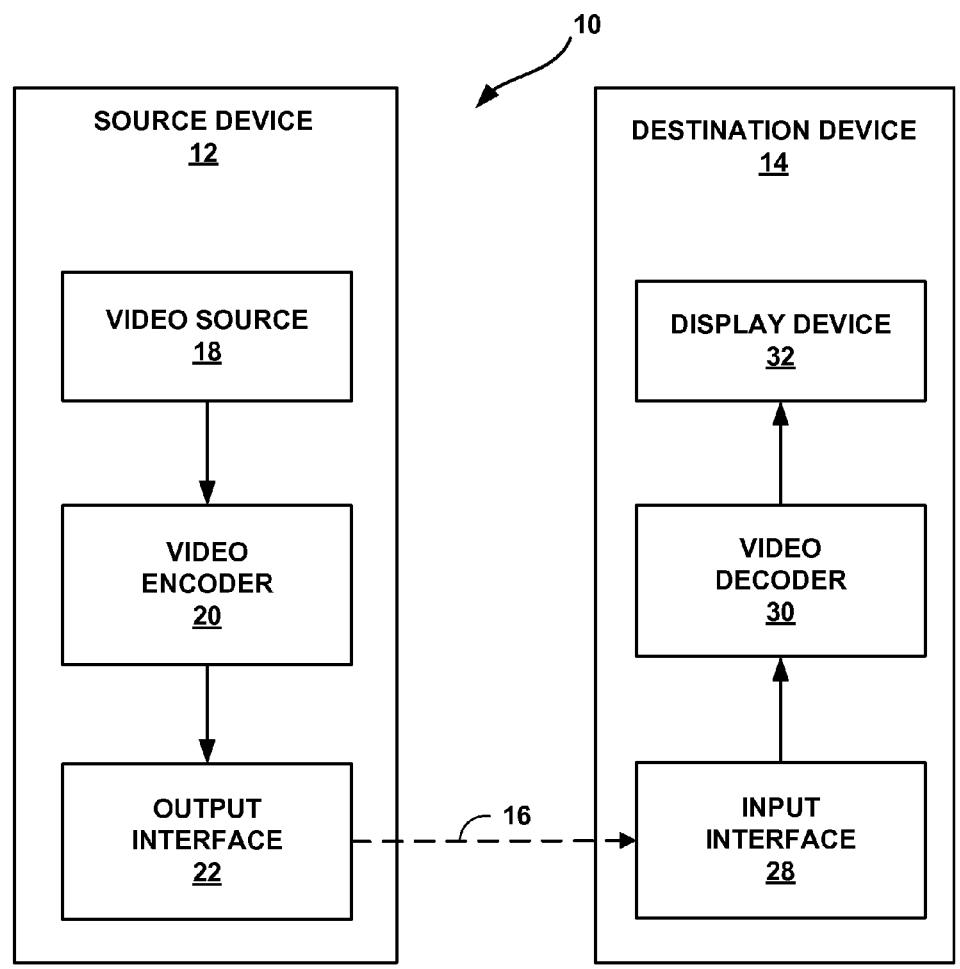
FIG. 1 is a block diagram illustrating an example video encoding and decoding system that may implement techniques of this disclosure.

Techniques of this disclosure relate to systems and methods for decoding data, including video data, encoded using an arithmetic coding based coding technique by using parallel processing techniques to reduce latency for the decoding. In particular, the systems and methods described herein may relate to arithmetic decoding techniques that process blocks of coded data at a time (e.g., several decoded symbols in a single clock cycle), which may be referred to as "block arithmetic coding". Such techniques may advantageously allow the decoding rate of the coded data to be approximately proportional to the encoded (e.g., compressed) data symbol rate of the coded data, meaning the number of cycles required to decode a string of encoded data symbols is approximately equal to the number of encoded data symbols. Such reduced latency can lead to faster computations for decoding, potentially saving time and energy. The techniques may be applied to any of the existing video codecs, such as High Efficiency Video Coding (HEVC) or be an efficient coding tool for any future video coding standards. Further, such techniques may be adapted to multiplier-free coding techniques (e.g., Q-Coder, MQ-Coder, etc.) and multiplier based coding techniques. This allows for the flexibility to have a reduced latency decoder without any negative impact on compression ratio (e.g., a multiplier based coding technique) or to be able to trade compression ratio for computational complexity (e.g., a multiplier-free based coding technique). Further, such techniques do not require bit-stuffing in order to perform the parallel processing. Though the techniques are described with respect to video coding, one of skill in the art will understand that such techniques can be used for coding of other types of data.

For example, serial transmission of digital data generally can be improved by using further compression to enhance low power requirements. Such serial transmission may be improved, according to the techniques discussed herein, for synchronous and/or asynchronous links. In particular, the compression techniques described herein may not only reduce the total number of bits that need to be transmitted over a synchronous link, but also reduce the number of synchronizing clocks needed to be transmitted between devices. More generally, the compression techniques discussed herein may reduce the number of clock cycles required to compress and decompress digital data, thereby requiring lower power to implement, such as by allowing clocks to be shutdown as quickly as possible to save power.

Video coding devices implement video compression techniques to encode and decode video data efficiently. Video compression techniques may include applying spatial prediction (e.g., intra-frame prediction, intra-prediction), temporal prediction (e.g., inter-frame prediction, inter-prediction), and/or other prediction techniques to reduce or remove redundancy inherent in video sequences. A video encoder typically partitions each picture of an original video sequence into rectangular regions referred to as video blocks or coding units. These video blocks may be encoded using a particular prediction mode.

These video blocks may be divided in one or more ways into one or more groups of smaller video blocks (e.g., prediction blocks (PB), transform blocks (TB)), each group individually representing the entire video block, as further described herein. Accordingly, references generally to blocks, unless otherwise specified, may refer to such video blocks (e.g., coding tree blocks (CTB), coding blocks, etc.), prediction blocks, transform blocks, or other appropriate blocks or sub-blocks, as would be understood by one of ordinary skill in the art. Further, each of these blocks may also interchangeably be referred to herein as "units" (e.g., coding tree unit (CTU), coding unit, prediction unit (PU), transform unit (TU), etc.). One of ordinary skill in the art will recognize that a unit may indicate a coding logical unit that is encoded in a bitstream, while a block may indicate a portion of video frame buffer a process is target to.

For inter-prediction modes, a video encoder typically searches for a block similar to the one being encoded in a frame in another temporal location, referred to as a reference frame. The video encoder may restrict the search to a certain spatial displacement from the block to be encoded. A best match may be located using a two-dimensional (2D) motion vector that includes a horizontal displacement component and a vertical displacement component. For an intra-prediction mode, a video encoder may form the predicted block using spatial prediction techniques based on data from previously encoded neighboring blocks within the same picture.

The video encoder may determine a prediction error, i.e., the difference between the pixel values in the block being encoded and the predicted block (also referred to as residual). The video encoder may also apply a transform to the prediction error, such as a discrete cosine transform (DCT), to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

For example, arithmetic coding is a form of entropy coding that may be used by the video encoder to entropy code syntax elements and/or control information. In particular, in entropy coding, frequently used characters are encoded and stored with fewer bits, and not as frequently used characters are encoded and stored with more bits. The representation of the decoded video sequence (e.g., syntax elements and/or control information) may be represented as a series or string of symbols (e.g., bits). The symbols may have different values including most probable symbols and least probable symbols. In particular, one symbol may be much more likely (i.e., most probable symbol) in the decoded string than another symbol (i.e., least probable symbol). For example, the most probable symbol may be 0, while the least probable symbol may be 1. The video encoder may be configured to encode the string of symbols to generate a string of encoded symbols that represents the decoded string of symbols. A video decoder may be configured to decode the encoded symbols to retrieve the original (i.e., decoded) string of symbols.

One example of an arithmetic encoding process that uses interval-scaling and integer arithmetic is shown in pseudo-code below.

```
While (symbols to encode) {
/* Start Section A*/
    Fetch next symbol to encode = 'x'      //'x'={0,1}
    //Cum_count(2) = Total_Count - Cum_count(0)
```

$$L \leftarrow L + \left\lfloor \frac{(U - L + 1) * \text{Cum\_count}(x)}{\text{Total\_Count}} \right\rfloor$$

$$U \leftarrow L + \left\lfloor \frac{(U - L + 1) * \text{Cum\_count}(x + 1)}{\text{Total\_Count}} \right\rfloor - 1$$

```
/*End Section A*/
/*Start Section B*/
```

While (MSB (most significant bit) of U and L are equal OR the current interval $[L - U]$ is bounded by the interval $\left\lfloor \frac{1}{4} - \frac{3}{4} \right\rfloor$ of 1023 (i.e., the max value of U)) {

```
    if (MSB of U and L are both equal to 'b') {
        set 'b' as the next encoded symbol      // 'b' = { 0, 1 }
        Shift L to the left by 1 bit and shift 0 into LSB (least significant bit)
        Shift U to the left by 1 bit and shift 1 into LSB
        if (Scale3 > 0){set the complement of 'b' Scale3 times as the next
            encoded symbol(s);
            set Scale3 = 0 }
    }
``` if$\left( \text{current interval}[L - U] \text{is bounded by the interval} \left\lfloor \frac{1}{4} - \frac{3}{4} \right\rfloor \text{of } 1023 \right)$ {

```
        shift L to the left by 1 bit and shift 0 into LSB
        shift U into left by 1 bit and shift 1 into LSB
        complement (new) MSB of L and U
        increment Scale3
    }
}
/*End Section B*/
}
```

In one example, the string to be encoded has a length of 200 bits (e.g., symbols), so the variables Total_Count and Cum_count(x) represent registers of length 8 bits (e.g., the least number of bits to be able to represent a value up to 200). One of skill in that art will understand that the pseudo code can be adapted for other appropriate register sizes and string lengths as well. Further, in the example, L and U may represent registers having a length of $2 + \lceil \log_2(\text{Total\_Count}) \rceil$, which in this example may be 10 bits. Scale3 may be a register of length $\lceil \log_2 (10-1) \rceil$, which in this example may be 4 bits. Further, the registers may be initialized as follows: L=0; Scale3=0; U is set to all 1's (i.e., 1023 in this example); Total_Count=200 (i.e., it represents the number of bits to be encoded); Cum_count(0)=0; Cum_count(1)=The total count of the most probable symbol (e.g., 0) in the string to be encoded; and Cum_count(2)=200 (i.e., it represents the number of bits to be encoded). The arithmetic encoding may be performed as follows according to encoding pseudo code A:

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error. For example, the video decoder may decode the string of encoded symbols encoded using an arithmetic coding based coding technique (such as based on pseudo code A) received from the video encoder to retrieve the syntax elements and/or control information.

One example of an arithmetic decoding process that uses interval-scaling and integer arithmetic is shown in pseudo code B below.

In one example, the string that was encoded had a length 200 bits (e.g., symbols), so the variables Total_Count, Cum_count(x), and Count_0 represent registers of length 8 bits (i.e., to be able to represent a value up to 200). The value of the length of the decoded string that was encoded and the count of the number of most probable symbols in the encoded string may be received from the encoder, for example as control information. One of skill in that art will understand that the pseudo code can be adapted for other appropriate register sizes and string lengths as well. Further, in the example, L, U, and T may represent registers having a length of $2+\lceil \log_2(\text{Total\_Count})\rceil$, which in this example may be 10 bits. Further, the registers may be initialized as follows: L=0; U is set to all 1's (i.e., 1023 in this example); Total_Count=200 (i.e., it represents the number of bits to be encoded); read the first $2+\lceil \log_2(\text{Total\_Count})\rceil$ bits of the encoded string into T (i.e., T represents the input encoded string); Cum_count(0)=0; Cum_count(1)=Count_0; Cum_count(2)=200 (i.e., it represents the number of bits to be encoded); and Count_0=the total count of the most probable symbol in the encoded string. The arithmetic decoding may be performed as follows according to a decoding pseudo code B:

```
While (all symbols not decoded) {
/*Start Section A/
    //Cum_count(2) = Total_Count − Cum_count(0)
    Val = (T − L + 1) * Total_Count − 1
    if(Val < Count_0 * (U − L + 1)){decode symbol 'x' as '0'}
    else{ decode symbol 'x' as '1'}
    L ← L + ⌊(U − L + 1)∗Cum_count(x) / Total_Count⌋
    U ← L + ⌊(U − L + 1)∗Cum_count(x + 1) / Total_Count⌋ − 1
/* End Section A*/
/* Start Section B*/
```

While (MSB (most significant bit) of U and L are equal OR the current interval $[L-U]$ is bounded by the interval $\left\lfloor\frac{1}{4} - \frac{3}{4}\right\rfloor$ of 1023 (i.e., the max value of U)) { if (MSB of U and L are both equal to 'b') { // 'b' = { 0, 1 }
        Shift L to the left by 1 bit and shift 0 into LSB (least significant bit)
        Shift U to the left by 1 bit and shift 1 into LSB
        Shift T to the left by 1 bit and read the next encoded bit of the string into LSB
    } if$\left(\text{current interval}[L - U]\text{ is bounded by the interval}\left\lfloor\frac{1}{4} - \frac{3}{4}\right\rfloor\text{ of }1023\right)$ {

Shift L to the left by 1 bit and shift 0 into LSB
        Shift U into left by 1 bit and shift 1 into LSB
        Shift T to the left by 1 bit and read the next encoded bit of the string into LSB
        Complement (new) MSB of L, U, and T
    }
}
/*End Section B*/
}

Referring to the first part of the first while loop (before the second while loop) of the decoding pseudo code B as Section A, and the second while loop nested in the first while loop as Section B, the pseudo code B represents a decoding algorithm. In this algorithm, each time Section A is executed, a single output symbol is decoded and then Section B is executed. In Section B, the while loop may execute one or more times, before returning to Section A. As can be seen from the pseudo code B, the number of times that Section A executes is equal to the length (i.e., number of symbols) of the decoded string of data (which is longer than the length of the encoded string of data received from the encoder). Accordingly, the rate of decoding of an encoded string of data according to the decoding algorithm is higher than the rate of the encoded string of data.

The techniques described herein take note that, if the condition of Section B is not met, and a new symbol does not need to be read into T for decoding, only Section A is executed for decoding the next symbol. Section B is only triggered if U and L equal or contained in the interval $$\left\lfloor 0 - \frac{1}{2}\right\rfloor, \left\lfloor\frac{1}{2} - 1\right\rfloor, \text{ or } \left\lfloor\frac{1}{4} - \frac{3}{4}\right\rfloor.$$

Accordingly, herein is described a technique for decoding an encoded string encoded using arithmetic coding techniques that uses parallel processing techniques to decode as many symbols as possible before triggering Section B of the algorithm. These symbols may be decoded at approximately the encoded symbol rate (e.g., one clock cycle per encoded symbol). The example described below assumes that the most probable symbol is '0' and therefore is designed to decode several '0's at once. One of skill in the art will note that similar techniques can be used to decode several most probable symbols of another value using parallel processing techniques.

In Section A, the value of L does not change so long as the decoded symbol is a '0'. Accordingly, the value of U can be decoded non-recursively as follows:

$$U_{n+1} = L + \left\lfloor \frac{(U_n - L + 1) * \text{Cum\_count}(x + 1)}{\text{Total\_Count}} \right\rfloor - 1$$

Let, $P = \frac{\text{Cum\_count}(1)}{\text{Total\_Count}}$ // The probability of a '0'

Assuming the floor operator is removed for both the encoder and decoder algorithms:

$$U_1 = (L - 1) + \lfloor P(U_0 - L + 1)\rfloor$$

-continued $$U_2 = (L-1) + \lfloor P((L-1) + \lfloor P(U_0 - L + 1)\rfloor) - L + 1)\rfloor$$
$$= (L-1) + \lfloor PL - P + P\lfloor P(U_0 - L + 1)\rfloor) - PL + P\rfloor$$
$$= (L-1) + \lfloor P\lfloor P(U_0 - L + 1)\rfloor\rfloor$$

$$U_N = (L-1) + \lfloor P \ldots \lfloor P\lfloor P(U_0 - L + 1)\rfloor\rfloor\rfloor \cong \quad \text{(Eq. 1)}$$
$$(L-1) + \text{floor}(P^N(U_0 - L + 1))$$

Accordingly, $U_N$ can be approximated with the above equation 1 provided the same equation 1 is used at both the encoder side and the decoder side. The only variable left to determine, therefore, is the number of '0's to decode or to determine the value of 'N' in the equation 1 of $U_N$.

Assuming L is unchanged and input symbols being decoded are 0's, the value of Val does not change. Accordingly, a set of parallel comparisons to determine the number of 0's to be decoded for every block decoding of Section A is as follows:

Val(1)<Count_0*($U_0$–L+1)→decode '0' else decode '1'                                              Eq. 2.1:

Val(2)<Count_0*($U_1$–L+1)→decode '00' else decode '01'                                           Eq. 2.2:

. . .

Val(N)<Count_0*($U_{N-1}$–L+1)→decode '00 . . . 0' else decode '00 . . . 1'                    Eq. 2.N:

Each of the above equations 2.1-2.N can be evaluated in parallel (e.g., a block of parallel decoding), and the first invalid condition (i.e., the invalid equation for the lowest value of N) gives the value of N. For example, if equation 2.3 is the first invalid equation, N=3. Therefore, depending on the number of equations 2.N that can be run in parallel (e.g., which may be dependent on the decoding hardware used, which may be any suitable form of specialized processing hardware designed and/or programmed to perform the described technique), several symbols can be decoded in a single clock cycle. In particular, as many consecutive most probable symbols in a row followed by a single least probable symbol can be decoded in a single clock cycle. Alternatively, if the number of consecutive most probable symbols in a row that can be decoded is limited by hardware constraints, and a least probable symbol is not reached (i.e., none of the comparisons is invalid), then that maximum number of consecutive most probable symbols is decoded. Therefore, the number of block iterations (e.g., number of times parallel comparisons are made) of Section A, based on the described technique, is dependent on the number of most probable symbols encoded consecutively, which means the rate of decoding symbols and executing Section A may be approximately proportional to the rate of the incoming encoded symbols (e.g, one clock cycle for decoding per encoded symbol).

Further, Section B of the decoder algorithm described in pseudo code B can also be evaluated in parallel. In particular, the computations performed in Section B are limited to bit shifts, complements, and comparisons of values. Accordingly, combinatorial logic can be implemented (e.g., any suitable form of specialized processing hardware designed and/or programmed to perform the described technique) to perform the calculations of Section B as parallel blocks (i.e., parallel computed logic).

For example, if two parallel blocks are used to compute Section B, a first block to compute Section B would be made of combinatorial logic to implement the algorithm of Section B as shown to compute a first run of the while loop of Section B. The second block to compute Section B would include look ahead logic and compute the two possible branches of Section B for the second run of the while loop of Section B, 1) with 1-bit left shift of U and L according to the first run of the while loop; and 2) with 1-bit left shift of U and L and also the complement of the MSBs of U, L, and T according to the first run of the while loop. The result of the second block to compute Section B that is used as the final result would be based on the result of the first block to compute Section B (e.g., similar to a carry chain logic). Accordingly, the computation of two passes of Section B can be performed in a single clock cycle.

Similarly, any number of additional parallel blocks may be used to compute Section B, to increase the number of passes of Section B that can be calculated in a single clock cycle. Additional parallel blocks would be configured to perform and calculate all of the possible branches at that run of the while loop (i.e., first, second, third, fourth, etc.). For example, the third block to compute Section B would need to compute 4 possible branches corresponding to the third run of the while loop (i.e., with 1-bit left shift of U and L according to each of the two possible second runs of the while loop; and with 1-bit left shift of U and L and also the complement of the MSBs of U, L, and T according to each of the two possible second runs of the while loop). The result of the final parallel block computed would be selected based on the results of the previous parallel blocks (i.e., the final block, is based on the previous block, which is based on the previous block, etc.). As can be seen, to increase the number of parallel blocks used to calculate Section B, for each successive block the logic increases exponentially (i.e., assuming the logic requirement of the first block is considered one, the logic requirement of each block is $2^x$, where x is the block number 1, 2, 3, 4, etc.).

Further, by using parallel blocks for processing Section B, the total number of iterations of Section B may be approximately equal to the number of encoded symbols being decoded.

It should be noted that the amount of logic (e.g., amount of parallel components in hardware) used to perform the parallel comparisons for Section A and/or the parallel processing of blocks in section B may be selected based on testing to find an appropriate balance between hardware costs and performance. For example, the amount of logic may vary depending on the choice of technology (e.g., DSP, FPGA, etc.) for implementation, and the type of data being coded.

In the example above, the bit-width of the register U is 10 bits. The number of iterations of Section B required at any time, therefore, would be less than 10. Therefore, the number of parallel blocks for Section B in such an implementation may be limited to no more than 10, and more specifically may be set at 7 as there may not be significant performance benefits above the use of 7 parallel blocks.

Based on the block parallel processing described for decoding, the total number of iterations of Section B is equal to the total number of encoded symbols to be decoded. Therefore, like Section A, the rate of executing Section B may be approximately proportional to the rate of the incoming encoded symbols (e.g, one clock cycle for execution per encoded symbol). Therefore, the decoding rate of the encoded symbols for Section A and Section B combined is approximately directly proportional to the encoded symbol rate (e.g., number of encoded symbols being decoded). In some embodiments, the computation of an iteration of both Section A and Section B may be computed together in a single clock cycle.

The techniques for decoding data, including video data, encoded using an arithmetic coding based coding technique by using parallel processing techniques described above are described with respect to a multiplier based coding technique. However, as discussed herein, similar techniques can be applied to multiple-free based coding techniques.

In one example, the techniques for decoding data herein may be used for data encoded using a Q-coder based multiplier-free encoding scheme. In particular Section A of the decoding algorithm of pseudo code B discussed above may be computed as follows.

As discussed above, in Section A, the value of L does not change so long as the decoded symbol is a '0'. Accordingly, the value of U can be decoded non-recursively as follows:

$$U_{n+1} = L + \left\lfloor \frac{(U_n - L + 1) * \text{Cum\_count}(x+1)}{\text{Total\_Count}} \right\rfloor - 1 \quad \text{(Eq. 3)}$$

Let, $P = \frac{\text{Cum\_count}(1)}{\text{Total\_Count}}$ // The probability of a '0'

Therefore, $Q = 1 - P$

Since U and L are scaled to $2^k$ for integer representation, the equation 3 can be rewritten where U and L are scaled to unity and then converting the integer form of the equation to a rational form, the following equation 4 can be derived:

$$u_{n+1} = l + P*(u_n - l) \quad \text{(Eq. 4)}$$

where u and l indicate unscaled values of U and L and are bounded between 0 and 1.

Applying a similar approximation as a Q-coder, the following holds true:

If $0 < K < 1$; then $K*Q \approx Q$ and $K*P = K*(1-Q) \approx K-Q$ (Eq. 5)

Applying the above conditional of equation 5 to $u_{n+1}$, the following can be derived:

$u_{n+1} = l + P*(u_n - l) \approx l + (u_n - l) - Q = u_n - Q$; $u_1 = u_0 - Q$; $u_2 = u_1 - Q = u_0 - 2*Q$; $u_3 = u_2 - Q = u_0 - 3*Q$;

Therefore, $u_{n+1} = u_0 - (n+1)*Q$ (Eq. 6)

If Q is different for every iteration as in an adaptive Q-coder, the equation 6 becomes:

$u_{n+1} = u_0 - \Sigma_{i=0}^{n} Q_i$ (Eq. 7)

The integer equivalents of these equations 6 and 7 would need to be scaled by Total_Count (e.g., by performing a shift operation) as follows:

$U_{n+1} = U_0 - \lfloor (n+1)*Q*\text{Total\_Count} \rfloor$ (Eq. 8)

$U_{n+1} = U_0 - \lfloor \Sigma_{i=0}^{n} Q_i * \text{Total\_Count} \rfloor$ (for a varying $Q$) (Eq. 9)

$L_1 = U_0 - \lfloor (Q_0 * \text{Total\_Count}) \rfloor$ (Eq. 10)

As discussed with the multiplier based approach, the approximation of $U_n$ may only be valid if it is applied both at the encoder and decoder to ensure matched tracking of L and U in both the encoder an the decoder.

Assuming L is unchanged and input symbols being decoded are 0's, the value of Val does not change.

From Section A the following comparison is made:

Val<Count_0*(U-L+1);

Further,

Val=(T-L+1)*Total_Count-1

Therefore:

(T-L+1)*Total_Count-1<Count_0*(U-L+1);

(T-L+1)≤P*(U-L+1); where P=Count_0/Total_Count and Q=1-P (T-L)<P*(U-L)+P; where 0≤P≤1 and 0≤Q≤1

(T-L+1)<P*(U-L);

$\text{Val}_{new} < P*(U-L)$; where $\text{Val}_{new} = (T-L+1)$

In addition, by applying Q-coder style approximation, and since U and L are scaled version of u and l for integer representation, the following holds true:

P*(U-L)=P*(u-l)*Total_Count=(u-l-Q)*Total_Count

Accordingly, a set of parallel comparisons to determine the number of 0's to be decoded for every block decoding of Section A is made as follows:

$\text{Valnew}(0) < (u(0) - l - Q) * \text{Total\_Count} \rightarrow$ decode '0' else decode '1'  Eq. 11.1

$\text{Valnew}(1) < (u(1) - l - Q) = (u(0) - l - 2*Q) * \text{Total\_Count} \rightarrow$ decode '00' else decode '01'  Eq. 11.2

...

$\text{Valnew}(n) < (u(2) - l - Q) = (u(0) - l - n*Q) * \text{Total\_Count} \rightarrow$ decode '00 ... 0' else decode '00 ... 1'  Eq. 11.n For the variable Q, the comparison becomes:

$\text{Val}_{n-1} < \text{Count\_0} * (U_{n-1} - L - \Sigma_{i=0}^{n} Q_i) * \text{Total\_Count} \rightarrow$ decode '00 . . . 0' else decode '00 . . . 1'  Eq. 11.n:

Each of the above equations 11.1-11.n can be evaluated in parallel (e.g., a block of parallel decoding), and the first invalid condition (i.e., the invalid equation for the lowest value of n) gives the value of n. For example, if equation 11.3 is the first invalid equation, n=3. Therefore, depending on the number of equations 11.n that can be run in parallel (e.g., which may be dependent on the decoding hardware used, which may be any suitable form of specialized processing hardware designed and/or programmed to perform the described technique), several symbols can be decoded in a single clock cycle. In particular, as many consecutive most probable symbols in a row followed by a single least probable symbol can be decoded in a single clock cycle. Alternatively, if the number of consecutive most probable symbols in a row that can be decoded is limited by hardware constraints, and a least probable symbol is not reached (i.e., none of the comparisons is invalid), then that maximum number of consecutive most probable symbols is decoded. Therefore, the number of block iterations (e.g., number of times parallel comparisons are made) of Section A, based on the described technique, is dependent on the number of most probable symbols encoded consecutively, which means the rate of decoding symbols and executing Section A may be approximately proportional to the rate of the incoming encoded symbols (e.g, one clock cycle for decoding per encoded symbol).

In another example, the techniques for decoding data herein may be used for data encoded using an Adaptive Q-coder based multiplier-free encoding scheme. For example, the JPEG Q-coder uses a table of precomputed Q values which are used each time a re-normalization (e.g., execution of Section B of the decoding algorithm) of the interval takes place. The tables used by JPEG may have 112 entries.

According to the techniques described herein, in the table, Q may be initialized to 0.5 and modified each time a re-normalization (i.e., execution of Section B) takes place instead of modified for every new input encoded symbol to be decoded. After a most probable symbol is decoded from the encoded symbols, the table changes the likelihood of the next decoded symbol being a most probable symbol by reducing the value of Q. After a least probable symbol is decoded from the encoded symbols, the table change the likelihood of the next decoded symbol being a most probable symbol be increasing the value of Q.

Since the value of Q is only updated when entering Section B of the decoding algorithm, this implies that while only executing Section A, the value of Q does not change. Accordingly, the following equations 12 and 13 can be used in integer form for decoding Adaptive Q-coder based encoded symbols (where U and L are scaled by Total_Count):

$$U_{n+1} = U_0 - \lfloor (n+1)*Q*\text{Total\_Count} \rfloor \quad \text{(Eq. 12)}$$

$$U_{n+1} = U_0 - \lfloor \Sigma_{i=0}^{n} Q_i * \text{Total\_Count} \rfloor \text{ (for a varying } Q\text{)} \quad \text{(Eq. 13)}$$

These are the same as equations 8 and 9 discussed for decoding the Q-coder based encoded symbols, and therefore the same comparisons using equation 11.n can be used to execute Section A to decode the encoded symbols.

The Q-coder approximations used for the example decoding techniques described with respect to the Adaptive Q-Coder and Q-Coder based coding techniques are valid based on the following analysis.

Let q be the true probability of a least probable symbol (e.g., 1) in a decoded data string and Q be the probability used in the approximation from the examples of the multiplier free approach to arithmetic decoding using parallel processing techniques. Accordingly, the unscaled version of the multiplier free equation 6 is as follows:

$$u_n = u_0 - n*Q \quad \text{(Eq. 14)}$$

Letting $A_i$ be the interval while entering Section A and $A_{ii}$ be the interval when exiting Section A, the change in the interval is calculated as follows based on equation 14:

$$\Delta A = A_i - A_{ii} = (u_0 - l) - (u_n - l) = u_0 - u_n = n*Q;$$
therefore $$n = \frac{\Delta A}{Q} \quad \text{(Eq. 15)}$$

Since q is the true probability of a least probable symbol, the probability Pmpsr of having n most probable symbols 0 in a sequence while being in Section A, based on equation 14, can be calculated as follows:

$$Pmpsr = (1-q)^n \Rightarrow \ln(Pmpsr) = \frac{\Delta A}{Q} \cdot \ln(1-q) \quad \text{(Eq. 16)}$$

For small values of q, the following approximation can be made:

$$\ln(Pmpsr) \approx -\frac{\Delta A}{Q} \cdot q; \text{ therefore} \quad \text{(Eq. 17)}$$

$$Pmpsr = \exp\left(-\frac{\Delta A}{Q} \cdot q\right) \quad \text{(Eq. 18)}$$

Where there are an equal number of most probable symbol and least probable symbol renormalizations, Pmpsr=0.5. Therefore:

$$\ln(Pmpsr) = \ln(2) \approx -0.6391 \quad \text{(Eq. 19)}$$

Using equations 17 and 19, and solving for Q, the following is derived:

$$Q = \frac{\Delta A}{\ln(2)} \cdot q \quad \text{(Eq. 20)}$$

Assuming that $\Delta A$ is typically less than 0.75 (i.e., about 0.639 or ln(2)), theoretically Q≈q, and the approximation therefore the approximation holds true.

Since the magnitude of $\Delta A$ is dependent on the type of renormalization, if the most probable symbol renormalization occurred last, $\Delta A$ is close to 0.75. Further, if the least probable symbol occurred last, $\Delta A$ is typically somewhat smaller than 0.75. Further, if Q is too large, Pmpsr is also large and the algorithm tends to move to a smaller value of Q. Conversely, if Q is too small, Pmpsr is small and the algorithm tends to move to a larger value of Q. Therefore, the algorithm adapts to and balances approximately close to where Q≈q.

It should be noted that, as one of ordinary skill in the art will understand based on this disclosure, that the encoding and decoding techniques may be implemented in different embodiments of systems and methods as described herein. Further, the encoding and decoding techniques implemented may be based on any of the examples (e.g., multiplier based approaches, multiplier free based approaches) described herein relating to pseudo code A and pseudo pseudo code B, or any similar coding technique, wherein the systems and methods determine a number of consecutive most probable symbols in a series of one or more decoded symbols by performing a plurality of parallel mathematical comparisons based on one or more encoded symbols.

FIG. 1 is a block diagram illustrating an example video encoding and decoding system 10 that may utilize and implement arithmetic coding based coding techniques by using parallel processing techniques as discussed herein. As shown in FIG. 1, system 10 includes a source device 12 that provides encoded video data to be decoded at a later time by a destination device 14. The video data may be encoded with an arithmetic coding based coding technique, such as according to pseudo code A or a similar coding technique, and as described herein. The video data may be decoded with an arithmetic coding based coding technique, such as according to pseudo code B or a similar coding technique, and as described herein. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for arithmetic coding discussed herein, such as encoding techniques similar to those described with respect to pseudo code A. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for utilizing arithmetic coding techniques discussed herein may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor, or even a general encoder/decoder that is not limited to video data. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding, or even coding, in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 (or any encoder or decoder that implements the techniques discussed herein related to arithmetic coding based coding techniques using parallel processing techniques) each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

Video encoder 20 and video decoder 30 may operate according to a video coding standard. Example video coding standards developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG) include High Efficiency Video Coding (HEVC) or ITU-T H.265, including its range extension, multiview extension (MV-HEVC) and scalable extension (SHVC). The finalized HEVC standard document is published as "ITU-T H.265, SERIES H: AUDIO-VISUAL AND MULTIMEDIA SYSTEMS Infrastructure of audiovisual services—Coding of moving video—High efficiency video coding," Telecommunication Standardization Sector of International Telecommunication Union (ITU), April 2013. Alternatively, video encoder 20 and video decoder 30 may operate according to other proprietary or industry standards, such as ISO/IEC MPEG-4 Visual and ITU-T H.264 (also known as ISO/IEC MPEG-4 AVC), including its Scalable Video Coding (SVC) extension and Multiview Video Coding (MVC) extension. The techniques of this disclosure, however, are not limited to any particular coding standard. For example, the techniques of this disclosure may be used with a variety of other proprietary or non-proprietary video coding techniques or subsequent standards, such as ITU-T H.266.

Figure 2:
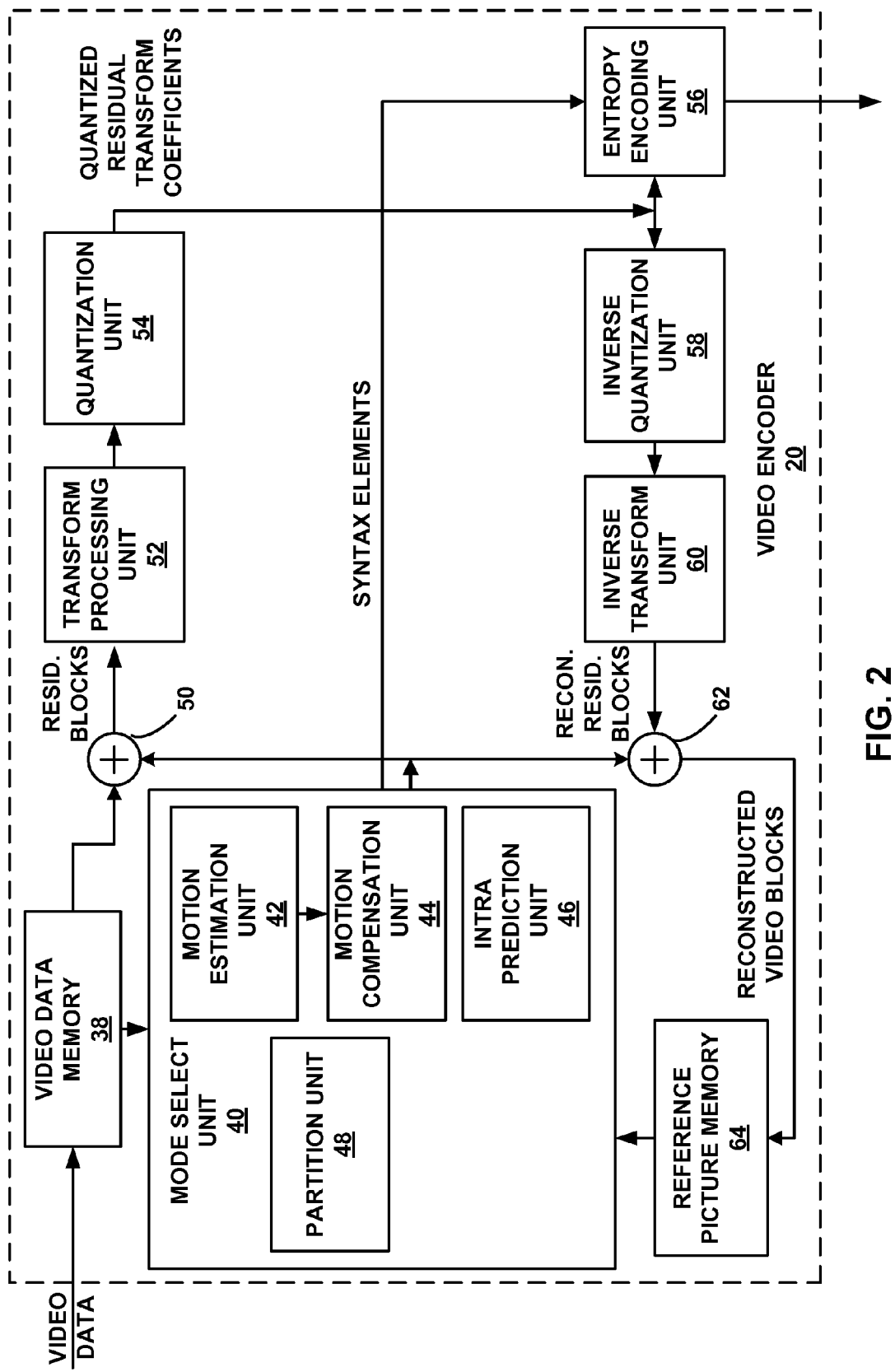
FIG. 2 is a block diagram illustrating an example of video encoder that may implement techniques of this disclosure.

FIG. 2 is a block diagram illustrating an example of video encoder 20 that may utilize and implement arithmetic coding based coding techniques by using parallel processing techniques as discussed herein. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes video data memory 38, mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Video data memory 38 may store the video data to be encoded by the components of video encoder 20. The video data stored in video data memory 38 may be obtained, for example, from video source 18. Reference picture memory 64 may be referred to as a DPB that stores reference video data for use in encoding video data by video encoder 20, e.g., in intra- or inter-coding modes. Video data memory 38 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 38 and reference picture memory 64 may be provided by the same memory device or separate memory devices. In various examples, video data memory 38 may be on-chip with other components of video encoder 20, or off-chip relative to those components.

Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients.

The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding, Q-Coding, Adaptive Q-Coding, arithmetic coding or another entropy coding technique. In the case of context-based entropy coding, context may be based on neighboring blocks. In particular, in some embodiments, the entropy encoding unit 56 may be configured to code the video data (e.g., quantized transform coefficients) according to arithmetic coding based coding techniques by using parallel processing techniques as discussed herein. For example, in some embodiments, entropy encoding unit 56 is configured to implement an arithmetic coding technique based on the pseudo code A as described herein. The entropy encoding unit 56 may be configured to use certain equations to approximate certain values or equations, such as in pseudo code A, in order to ensure matched tracking of register values at the entropy encoding unit 56 and a corresponding decoder. For example, the entropy encoding unit 56 may be configured to utilize or implement one or more of equations 1, 8, 9, 10, 12, and 13.

Following the entropy coding by entropy encoding unit 56, the encoded bitstream comprising a string of one or more encoded symbols (e.g., least probable symbols and most probable symbols) may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Figure 3:
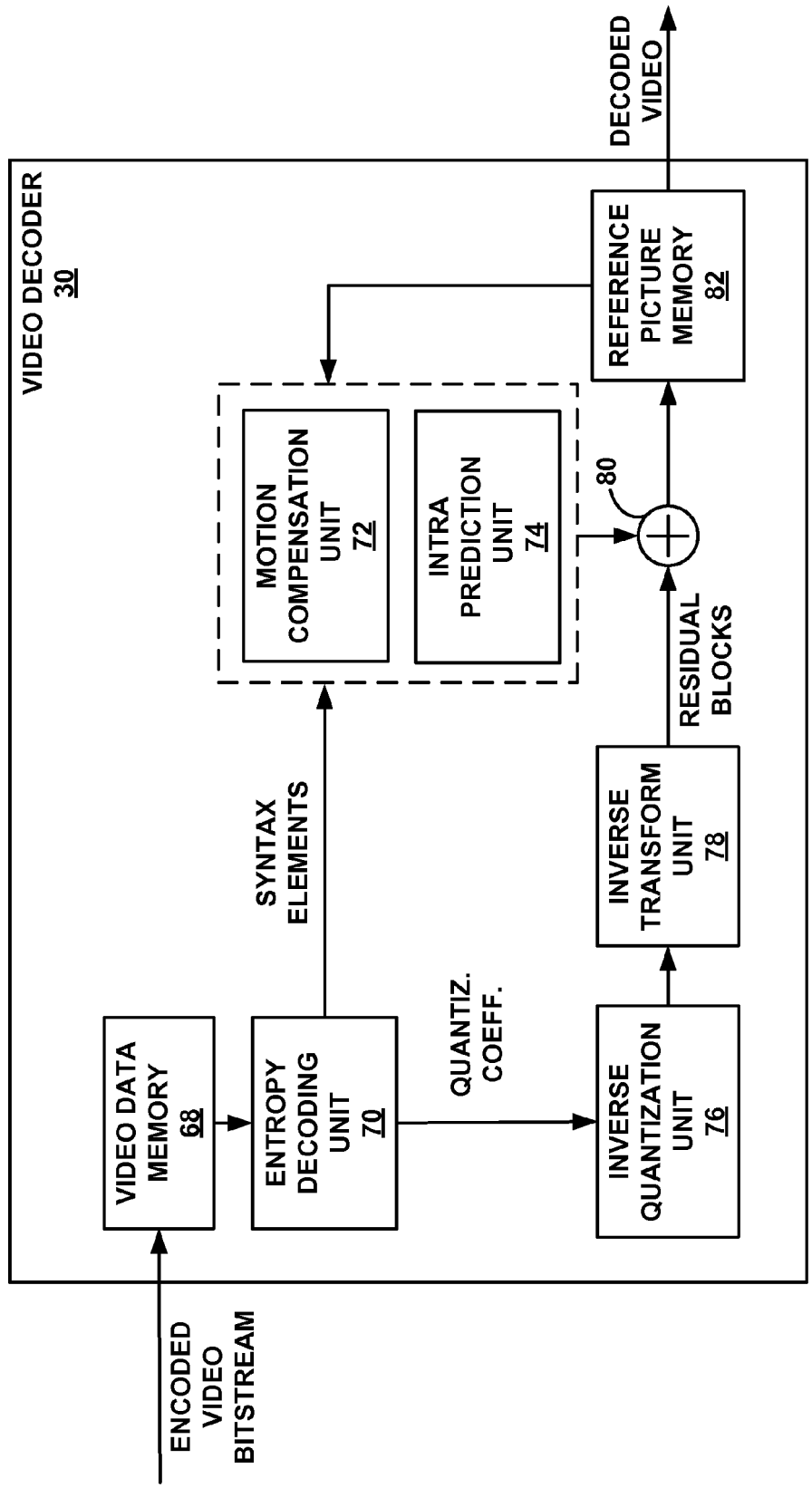
FIG. 3 is a block diagram illustrating an example of video decoder that may implement techniques of this disclosure.

FIG. 3 is a block diagram illustrating an example of video decoder 30 that may utilize and implement arithmetic coding based coding techniques by using parallel processing techniques as discussed herein. In the example of FIG. 3, video decoder 30 includes video data memory 68, an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream comprising a string of one or more encoded symbols (e.g., least probable symbols and most probable symbols) that represents video blocks of an encoded video slice and associated syntax elements from video encoder 20. The video data stored in video data memory 68 may be obtained, for example, from computer-readable medium, e.g., from a local video source, such as a camera, via wired or wireless network communication of video data, or by accessing physical data storage media. Video data memory 68 may form a coded picture buffer (CPB) that stores encoded video data from an encoded video bitstream. Reference picture memory 82 may be referred to as a DPB that stores reference video data for use in decoding video data by video decoder 30, e.g., in intra- or inter-coding modes. Video data memory 68 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 68 and reference picture memory 82 may be provided by the same memory device or separate memory devices. In various examples, video data memory 68 may be on-chip with other components of video decoder 30, or off-chip relative to those components.

Entropy decoding unit 70 of video decoder 30 entropy decodes the bitstream to generate quantized coefficients, motion vectors or intra-prediction mode indicators, and other syntax elements. In particular, in some embodiments, the entropy decoding unit 70 may be configured to decode the bitstream according to arithmetic coding based coding techniques by using parallel processing techniques as discussed herein. For example, in some embodiments, entropy decoding unit 70 is configured to implement an arithmetic decoding technique based on the pseudo code B as described herein. The entropy decoding unit 70 may be configured to use certain equations to approximate certain values or equations, such as in pseudo code B, in order to ensure matched tracking of register values at the entropy decoding unit 70 and corresponding entropy encoding unit 56. For example, the entropy decoding unit 70 may be configured to utilize or implement one or more of equations 1, 8, 9, 10, 12, and 13. Further, the entropy decoding unit 70 may be configured to use parallel processing techniques as described herein, such as with respect to pseudo code B, to decode the bitstream. For example, entropy decoding unit 70 may be configured to perform a plurality of parallel mathematical comparisons (e.g., equation 2.N and/or 11.n) in order to determine a number of consecutive most probable symbols to be decoded based on the bitstream. Accordingly, entropy decoding unit 70 may be configured to decode symbols according to Section A of pseudo code B, at approximately the data rate of the bitstream.

Additionally or alternatively, the entropy decoding unit 70 is configured to implement parallel blocks for selecting symbols to decode (e.g., reading additional symbols from the bitstream for decoding) according to Section B of pseudo code B, as discussed herein. Accordingly, entropy decoding unit 70 may be configured to execute Section B of pseudo code B, at approximately the data rate of the bitstream. Further, entropy decoding unit 70 may be configured to perform an iteration of parallel processing of Section A and Section B in a single clock cycle.

Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Figure 4:
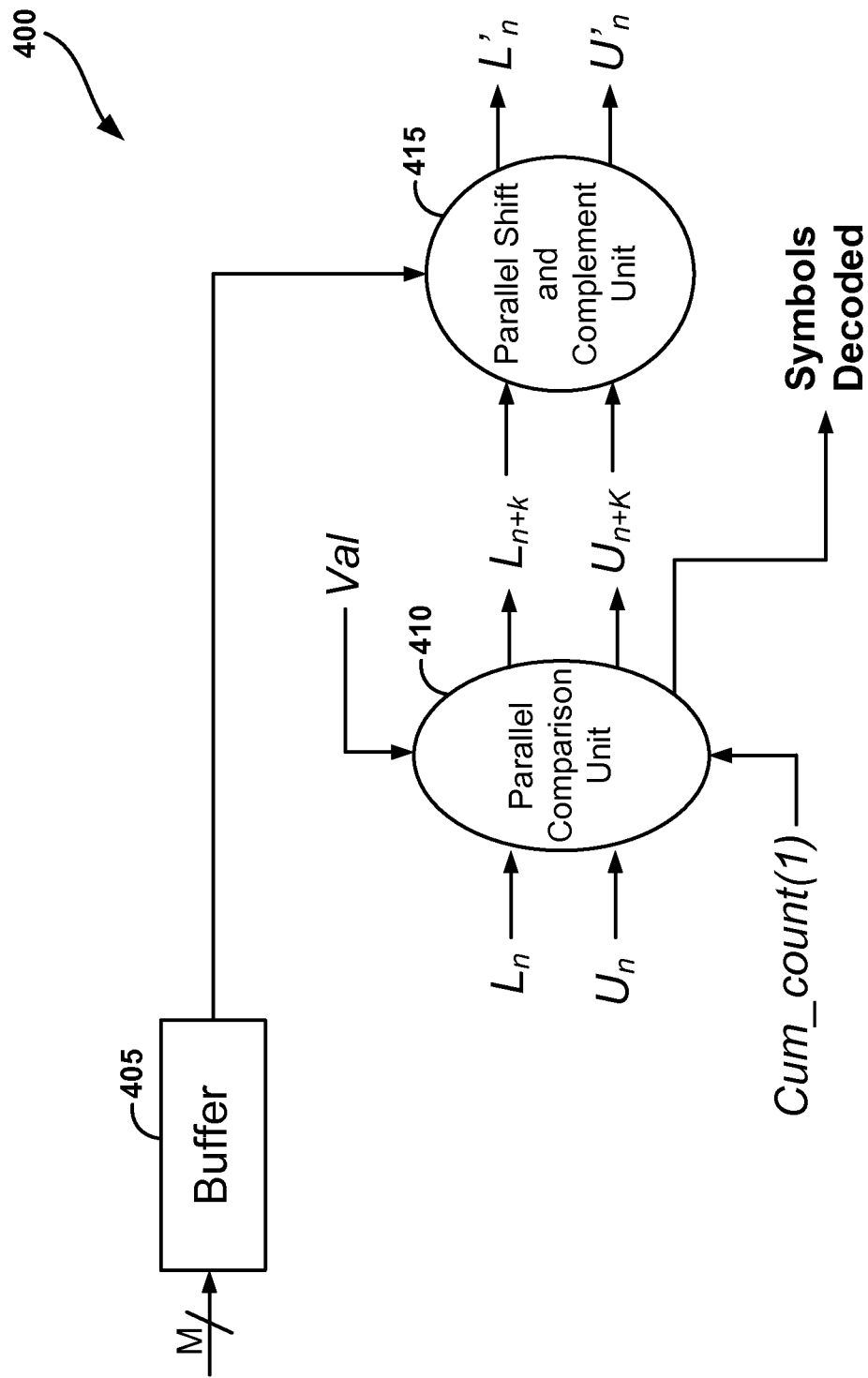
FIG. 4 is a block diagram illustrating an example of decoder that may implement techniques of this disclosure.

FIG. 4 is a block diagram illustrating an example of decoder 400 that may utilize and implement arithmetic coding based coding techniques by using parallel processing techniques as discussed herein. For example, the decoder 400 may be an example of the entropy decoding unit 70.

As shown, the decoder 400 includes a buffer 405 (or other type of appropriate memory). As shown, the buffer 405 is a first-in-first-out (FIFO) buffer. The buffer 405 may be configured to receive M symbols (e.g., bits) per clock cycle of an encoded data stream comprising a string of encoded symbols encoded using an arithmetic coding based coding technique (e.g., based on pseudo code A; and buffer 405 may correspond to register T). The string of encoded symbols may represent a series of one or more decoded symbols, wherein each of the one or more decoded symbols comprises one of a most probable symbols (e.g., 0) and a least probable symbol (e.g., 1).

The decoder 400 may further include a parallel comparison unit 410 and a parallel shift and complement unit 415. The parallel comparison unit 410 may be configured to implement one or more parallel processing techniques for decoding data according to Section A of pseudo code B, or similar parallel processing techniques. The parallel shift and complement unit 415 may be configured to implement parallel blocks for decoding symbols according to Section B of pseudo code B, as discussed herein, or similar parallel processing techniques.

For example, parallel comparison unit 410 may be configured to receive as input the encoded symbols from buffer 405, as well as input including variables and values from registers (e.g., L, U, Cum_count( ), Count_0, Total_Count, etc.; from pseudo code B and which may be initialized as discussed). The parallel comparison unit 410 may be configured to use the received input to determine a number of consecutive most probable symbols in the series of one or more decoded symbols by performing a plurality of parallel mathematical comparisons (e.g., such as in equations 2.N and/or 11.n). The parallel comparison unit 410 may be configured to decode one or more of the encoded symbols to output a group of symbols of the series of one or more decoded symbols based on the plurality of parallel mathematical comparisons, wherein the group of symbols includes the number of consecutive most probable symbols. The group of symbols, as discussed with respect to equations 2.N and 11.n, may also include one least probable symbol that follows the number of consecutive most probable symbols.

The parallel comparison unit 410 may also be configured to perform the other calculations to update values in registers (e.g., L and U) of Section A of pseudo code B. The parallel shift and complement unit 415 may be configured to receive as input the updated register values, and input from the buffer 405, to implement parallel blocks for selecting symbols to decode (e.g., reading additional symbols from the encoded data stream for decoding) according to Section B of pseudo code B, as discussed herein. The parallel comparison unit 410 and the parallel shift and complement unit 415 may be configured to both execute a single iteration (including performing parallel comparisons and parallel block shifts and complements) together in a single clock cycle. Accordingly, the decoder 400 is configured to decode data encoded using arithmetic coding based coding techniques by using parallel processing techniques as discussed herein.

Figure 5:
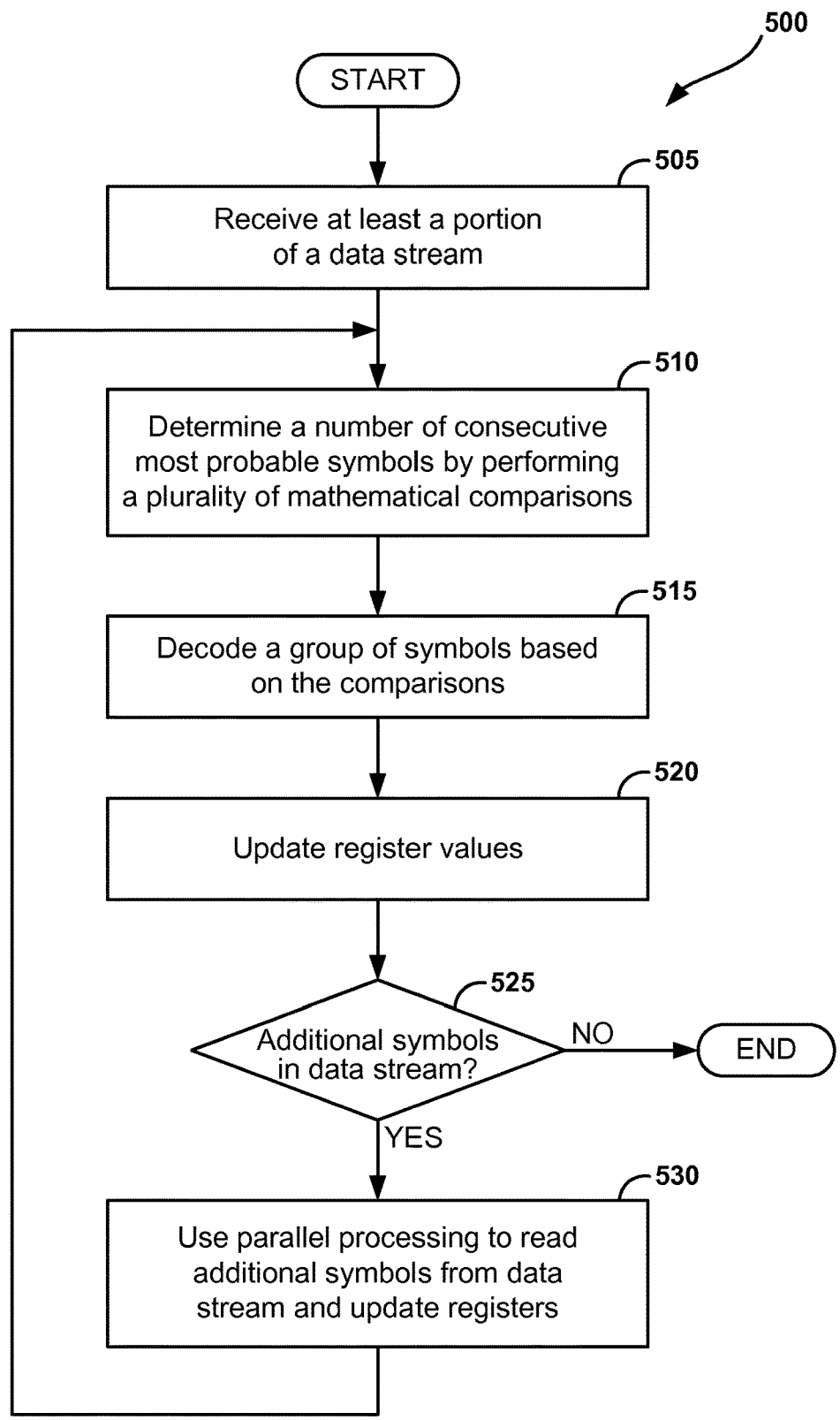
FIG. 5 is an illustration of a flowchart of a process for decoding compressed data.

FIG. 5 is an illustration of a flowchart of a process 500 for decoding compressed data. The process 500 may be implemented in any suitable decoder, such as the decoder 400 described herein. As shown, at a block 505, a decoder receives, in a buffer, at least a portions of a data stream comprising a string of encoded symbols encoded using an arithmetic coding based coding technique. The string of encoded symbols represents a series of one or more decoded symbols. Each of the one or more decoded symbols comprises one of a most probable symbol and a least probable symbol.

Further, at a block 510, the decoder determines a number of consecutive most probable symbols in the series of one or more decoded symbols by performing a plurality of parallel mathematical comparisons (e.g., such as in equations 2.N and/or 11.n and as discussed with respect to Section A of pseudo code B) based on one or more of the encoded symbols.

Continuing, at a block 515, the decoder decodes a group of symbols of the series of one or more decoded symbols based on the plurality of parallel mathematical comparisons. The group of symbols comprises the number of consecutive most probable symbols. The group of symbols, as discussed with respect to equations 2.N and 11.n, may also include one least probable symbol that follows the number of consecutive most probable symbols.

Further, at a block 520, the decoder performs other calculations to update values in registers (e.g., as discussed with respect to Section A of pseudo code B).

At a block 525, the decoder determines if there are any more encoded symbols in the data stream to decode. If at the block 525, it is determined there are no additional encoded symbols to decode, the process ends. If at the block 525, it is determined there are additional encoded symbols to decode, the process continues to a block 530.

At the block 530, the decoder uses parallel processing to update values in registers and read additional encoded symbols from the data stream into the buffer. For example, the decoder may perform shifts and complements of certain register values, and check whether certain criteria are met based on the register values to determine how to read the additional encoded symbols from the data stream into the buffer (e.g., as discussed with respect to Section B of pseudo code B). The process 500 may then return to block 510.

As discussed above, for decoders that implement the parallel processing techniques for decoding based on arithmetic coding techniques, the degree of parallelization for implementing Section A and Section B of pseudo code B is a design choice based on costs, efficiency gains, and the type of hardware used to implement the techniques. For example, in decoder 400, a choice can be made as to the size of buffer 405, the number of comparisons the parallel comparison unit 410 is configured to make in parallel, the number of parallel block iterations the parallel shift and complement unit 415 is configured to make in parallel. These choices may affect the number of clock cycles required to decode data.

In some embodiments, the number of comparisons the parallel comparison unit 410 is configured to make in parallel is set to 6, the number of parallel block iterations the parallel shift and complement unit 415 is configured to make in parallel is set to 7, and the parallel comparison unit 410 and the parallel shift and complement unit 415 are configured to operate in a single clock cycle. Accordingly, the size of buffer 405 can be reduced while still achieving a good decode rate. Further, the input symbol rate may be a single input symbol per clock cycle, or two input symbols per clock cycle (e.g., in a dual data rate (DDR) system). In some embodiments, the number of comparisons the parallel comparison unit 410 is configured to make in parallel is set to 4 to reduce the complexity of the parallel comparison unit 410. Further, the hardware complexity and cost vs performance may still result in good performance. One of ordinary skill in the art will recognize that other design choices can be made, however, these particular design choices, or similar design choices, may provide certain advantages with respect to performance vs. complexity.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding compressed video data, the method comprising:
   receiving a video data stream comprising a string of encoded symbols, the string of encoded symbols representing an encoding of a binary sequence, wherein, in the binary sequence, a first symbol appears more frequently than a second symbol, and wherein the string of encoded symbols encodes probabilities of successive occurrences of the first symbol in the binary sequence;
   receiving, with the video data stream, a length of the binary sequence and a count of occurrences of the first symbol in the binary sequence;
   performing multiple comparisons in parallel, wherein each of the multiple comparisons compare a current value of a subset of the string of encoded symbols against a first probability of the current value encoding only the first symbol and a second probability of the current value encoding an occurrence of the second symbol, wherein the first probability and the second probability are based on the length of the binary sequence and the count of occurrences of the first symbol, and wherein the first probability is adjusted for successive comparisons of the multiple comparisons to include more occurrences of the first symbol;
   determining a count of consecutive occurrences of the first symbol in the subset of the string of encoded symbols based on a particular comparison from the multiple comparisons being invalid; and
   outputting a sequence of the first symbol followed by an instance of the second symbol, wherein a number of the first symbol in the sequence is equal to the count of consecutive occurrences of the first symbol.

2. The method of claim 1, wherein performing the multiple comparisons and outputting the sequence completes in a single clock cycle.

3. The method of claim 1, wherein the string of encoded symbols is encoded without using bit-stuffing techniques.

4. The method of claim 1, wherein the string of encoded symbols is encoded based on one of arithmetic coding or Q-coding.

5. The method of claim 1, wherein the string of encoded symbols is encoded based on a multiplier based coding technique.

6. The method of claim 1, wherein the sequence is indicative of one or more syntax elements defining at least a portion of a sequence of pictures.

7. A system for decoding compressed video data, the system comprising:
   a memory configured to receive a video data stream comprising a string of encoded symbols, the string of encoded symbols represents an encoding of a binary sequence, wherein, in the binary sequence, a first symbol appears more frequently than a second symbol, and wherein the string of encoded symbols encodes probabilities of successive occurrences of the first symbol in the binary sequence; and
   a processor configured to:
      receive, with the video data stream, a length of the binary sequence and a count of occurrences of the first symbol in the binary sequence;
      perform multiple comparisons in parallel, wherein each of the multiple comparisons compare a current value of a subset of the string of encoded symbols against a first probability of the current value encoding only the first symbol and a second probability of the current value encoding an occurrence of the second symbol, wherein the first probability and the second probability are based on the length of the binary sequence and the count of occurrences of the first symbol, and wherein the first probability is adjusted for successive comparisons of the multiple comparisons to include more occurrences of the first symbol;
      determine a count of consecutive occurrences of the first symbol in the subset of the string of encoded symbols based on a particular comparison from the multiple comparisons being invalid; and
      output a sequence of the first symbol followed by an instance of the second symbol, wherein a number of the first symbol in the sequence is equal to the count of consecutive occurrences of the first symbol.

8. The system of claim 7, wherein performing the multiple comparisons and outputting the sequence completes in a single clock cycle.

9. The system of claim 7, wherein the string of encoded symbols is encoded without using bit-stuffing techniques.

10. The system of claim 7, wherein the string of encoded symbols is encoded based on one of the following: arithmetic coding or Q-coding.

11. The system of claim 7, wherein the string of encoded symbols is encoded based on a multiplier based coding technique.

12. The system of claim 7, wherein the sequence is indicative of one or more syntax elements defining at least a portion of a sequence of pictures.

13. A non-transitory computer-readable medium having stored thereon instructions that, when executed, cause a processor of a device for decoding data to perform operations including:
   receiving a video data stream comprising a string of encoded symbols, the string of encoded symbols representing an encoding of a binary sequence, wherein, in the binary sequence, a first symbol appears more frequently than a second symbol, and wherein the string of encoded symbols encodes probabilities of successive occurrences of the first symbol in the binary sequence;

receiving, with the video data stream, a length of the binary sequence and a count of occurrences of the first symbol in the binary sequence;

performing multiple comparisons in parallel, wherein each of the multiple comparisons compare a current value of a subset of the string of encoded symbols against a first probability of the current value encoding only the first symbol and a second probability of the current value encoding an occurrence of the second symbol, wherein the first probability and the second probability are based on the length of the binary sequence and the count of occurrences of the first symbol, and wherein the first probability is adjusted for successive comparisons of the multiple comparisons to include more occurrences of the first symbol;

determining a count of consecutive occurrences of the first symbol in the subset of the string of encoded symbols based on a particular comparison from the multiple comparisons being invalid; and outputting a sequence of the first symbol followed by an instance of the second symbol, wherein a number of the first symbol in the sequence is equal to the count of consecutive occurrences of the first symbol.

14. The non-transitory computer-readable medium of claim 13, wherein performing the multiple comparisons and outputting the sequence completes in a single clock cycle.

15. The non-transitory computer-readable medium of claim 14, wherein the string of encoded symbols is encoded without using bit-stuffing techniques.

16. The non-transitory computer-readable medium of claim 14, wherein the string of encoded symbols is encoded based on one of arithmetic coding and Q-coding.

17. The non-transitory computer-readable medium of claim 14, wherein the string of encoded symbols is encoded based on a multiplier based coding technique.

18. A system for decoding compressed video data, the system comprising:

means for receiving a video data stream comprising a string of encoded symbols, the string of encoded symbols representing an encoding of a binary sequence, wherein, in the binary sequence, a first symbol appears more frequently than a second symbol, and wherein the string of encoded symbols encodes probabilities of successive occurrences of the first symbol in the binary sequence;

means for receiving, with the video data stream, a length of the binary sequence and a count of occurrences of the first symbol in the binary sequence;

means for performing multiple comparisons in parallel, wherein each of the multiple comparisons compare a current value of a subset of the string of encoded symbols against a first probability of the current value encoding only the first symbol and a second probability of the current value encoding an occurrence of the second symbol, wherein the first probability and the second probability are based on the length of the binary sequence and the count of occurrences of the first symbol, and wherein the first probability is adjusted for successive comparisons of the multiple comparisons to include more occurrences of the first symbol;

means for determining a count of consecutive occurrences of the first symbol in the subset of the string of encoded symbols based on a particular comparison from the multiple comparisons being invalid; and means for outputting a sequence of the first symbol followed by an instance of the second symbol, wherein a number of the first symbol in the sequence is equal to the count of consecutive occurrences of the first symbol.

19. The system of claim 18, wherein performing the multiple comparisons and outputting the sequence completes in a single clock cycle.

20. The system of claim 18, wherein the string of encoded symbols is encoded without using bit-stuffing techniques.

21. The system of claim 18, wherein the string of encoded symbols is encoded based on one of arithmetic coding and Q-coding.

22. The system of claim 18, wherein the string of encoded symbols is encoded based on a multiplier based coding technique.

23. The method of claim 1, further comprising:
determining to read a new symbol into the subset of the string of encoded symbols based on a bit of the first probability being equal to a corresponding bit of the second probability or a difference between the first probability and the second probability being within a range, the range including a middle of a range of possible values for the first probability and the second probability.

24. The method of claim 1, further comprising:
simultaneously performing:
a first shift operation on the first probability, the second probability, and the subset of the string of encoded symbols; and
a second shift operation on the first probability, the second probability, and the subset of the string of encoded symbols, and a complement of each of the first probability, the second probability, and the subset of the string of encoded symbols;
wherein shifting of the subset of the string of encoded symbols reads a next bit of the string of encoded symbols into the subset.

25. The method of claim 24, wherein simultaneous performance of the first shift operation and the second shift operation occurs when the particular comparison from the multiple comparisons is found to be invalid.

26. The system of claim 7, wherein the processor is further configured to:
determine to read a new symbol into the subset of the string of encoded symbols based on a bit of the first probability being equal to a corresponding bit of the second probability or a difference between the first probability and the second probability being within a range, the range including a middle of a range of possible values for the first probability and the second probability.

27. The non-transitory computer-readable medium of claim 13, further comprising:
determining to read a new symbol into the subset of the string of encoded symbols based on a bit of the first probability being equal to a corresponding bit of the second probability or a difference between the first probability and the second probability being within a range, the range including a middle of a range of possible values for the first probability and the second probability.

28. The system of claim 18, further comprising:
means for determining to read a new symbol into the subset of the string of encoded symbols based on a bit of the first probability being equal to a corresponding bit of the second probability or a difference between the first probability and the second probability being within a range, the range including a middle of a range of possible values for the first probability and the second probability.

* * * * *